United States Patent [19]

Kurisu

[11] Patent Number: 4,677,685

[45] Date of Patent: Jun. 30, 1987

[54] METHOD AND APPARATUS FOR DOWNLOADING A CODE DEFINING THE CHANNEL TRANSMISSION FORMAT EMPLOYED IN AN ADDRESSABLE CATV SYSTEM

[75] Inventor: Motohiro Kurisu, Wheeling, Ill.

[73] Assignee: Zenith Electronics Corporation, Glenview, Ill.

[21] Appl. No.: 755,741

[22] Filed: Jul. 16, 1985

[51] Int. Cl.[4] .......................... H04H 1/02; H04N 7/16
[52] U.S. Cl. .......................................... 455/4; 455/186; 358/86; 358/349; 380/20
[58] Field of Search ........................................ 455/3-6, 455/161.85, 186; 358/114, 122, 86

[56] References Cited

U.S. PATENT DOCUMENTS

| | | |
|---|---|---|
| 4,079,419 | 3/1978 | Siegle et al. |
| 4,460,922 | 7/1984 | Ensinger et al. .................... 358/122 |
| 4,475,123 | 10/1984 | Dumbauld et al. ..................... 455/4 |
| 4,503,462 | 3/1985 | Kelly et al. |
| 4,514,761 | 4/1985 | Merrell et al. ...................... 358/122 |
| 4,535,355 | 8/1985 | Arn et al. ............................ 358/122 |
| 4,536,791 | 8/1985 | Campell et al. ..................... 358/114 |

Primary Examiner—Jin F. Ng

[57] ABSTRACT

A tuning mode command identifying the channel transmission format being used in an addressable CATV system is transmitted via a plurality of encoded CATV channels for downloading in subscriber home terminals. Downloading at the home terminals is effected by executing a plurality of sequential tuning cycles each comprising sequentially tuning successive CATV channels configured according to a different transmission format until a channel is tuned on which encoded data is being accurately received.

7 Claims, 2 Drawing Figures

METHOD AND APPARATUS FOR DOWNLOADING A CODE DEFINING THE CHANNEL TRANSMISSION FORMAT EMPLOYED IN AN ADDRESSABLE CATV SYSTEM

BACKGROUND OF THE INVENTION

The present invention relates generally to cable television (CATV) systems and particularly concerns a technique for downloading selected information into the subscriber terminals of a CATV system.

A CATV system typically comprises a headend which transmits a plurality of television programming signals through a coaxial cable, each television programming signal being transmitted over a respective 6 MHz RF television channel. Each system subscriber is provided with a home terminal which functions as an interface between the signals transmitted over the coaxial cable and the subscriber's television receiver. In an addressable CATV system, the subscriber terminal is responsive to various encoded data signals transmitted by the headend for selectively authorizing viewing by the subscriber of selected channels or programs and not others. Such selective authorization is facilitated by scrambling the video content of the transmitted signals and using the subscriber terminal to selectively unscramble for viewing only those signals which the subscriber has been authorized to receive.

The RF channel configuration or format used in a CATV system may conform to any one of a number of different standards. These standards include the FCC broadcast format, the so-called HRC (harmonically related carriers) format and the so-called IRC (incrementally related carriers) format. In the FCC broadcast standard, all RF cable channels are spaced by integral multiples of 6 MHz from each other except channels 5 and 6 due to a 4 MHz gap between channels 4 and 5. Cable operators have found that certain types of distortions are reduced when all of the transmitted channels have picture carriers on frequencies that are integral multiples of 6 MHz. Thus, some CATV operators have adopted the HRC transmission format in which all of the RF cable channels are shifted in frequency with respect to the FCC standard to assume the desired channel spacing. Other operators have adopted the IRC transmission format wherein the desired channel spacing is realized by shifting the frenquencies of only channels 5 and 6; in particular, by shifting these channels downward in frequency so as to assume a contiguous relationship with channels 2-4.

In accordance with the foregoing, it will be appreciated that any given cable operator can employ any one of a plurality of different transmission formats. This creates a problem for the manufacture of the subscriber home terminals in that the channel tuning function of the terminal must correspond to the particular channel transmission format of the CATV system in which it is intended to be used. One solution to this problem is to preset or preprogram the tuning function of each terminal at the factory in accordance with the transmission format of the CATV system in which the terminal is to be used. Such factory preprogramming is undesirable for a number of reasons including cost and the possibility of errors. A more desirable solution to the problem is that of producing terminals at the factory which are operable in multiple tuning modes and subsequently programming the terminal for proper operation after it is installed in a CATV system by downloading an appropriate tuning mode command transmitted by the headend. While certainly representing a desirable solution to the problem, such has heretofore not been practical, particularly in CATV systems employing in-band data transmission techniques, since accurate data reception requires that the terminal be properly tuned to a transmitted channel. Such proper tuning cannot, of course, be assured since the tuning mode of the terminal as delivered from the factory may or may not correspond to the transmission format being used.

OBJECTS OF THE INVENTION

It is therefore a basic object of the present invention to provide an improved technique for downloading data into the subscriber terminals of a CATV system.

It is a further object of the invention to provide an improved technique for downloading a tuning mode command into the subscriber terminals of a CATV system which may be using any one of a plurality of RF channel transmission formats.

BRIEF DESCRIPTION OF THE DRAWINGS

The features of this invention which are believed to be novel are set forth with particularity in the appended claims. The invention, together with its objects and advantages thereof, may best be understood by reference to the following description taken in conjunction with the accompanying drawings in which:

DESCRIPTION OF THE PREFERRED EMBODIMENT

Figure 1:
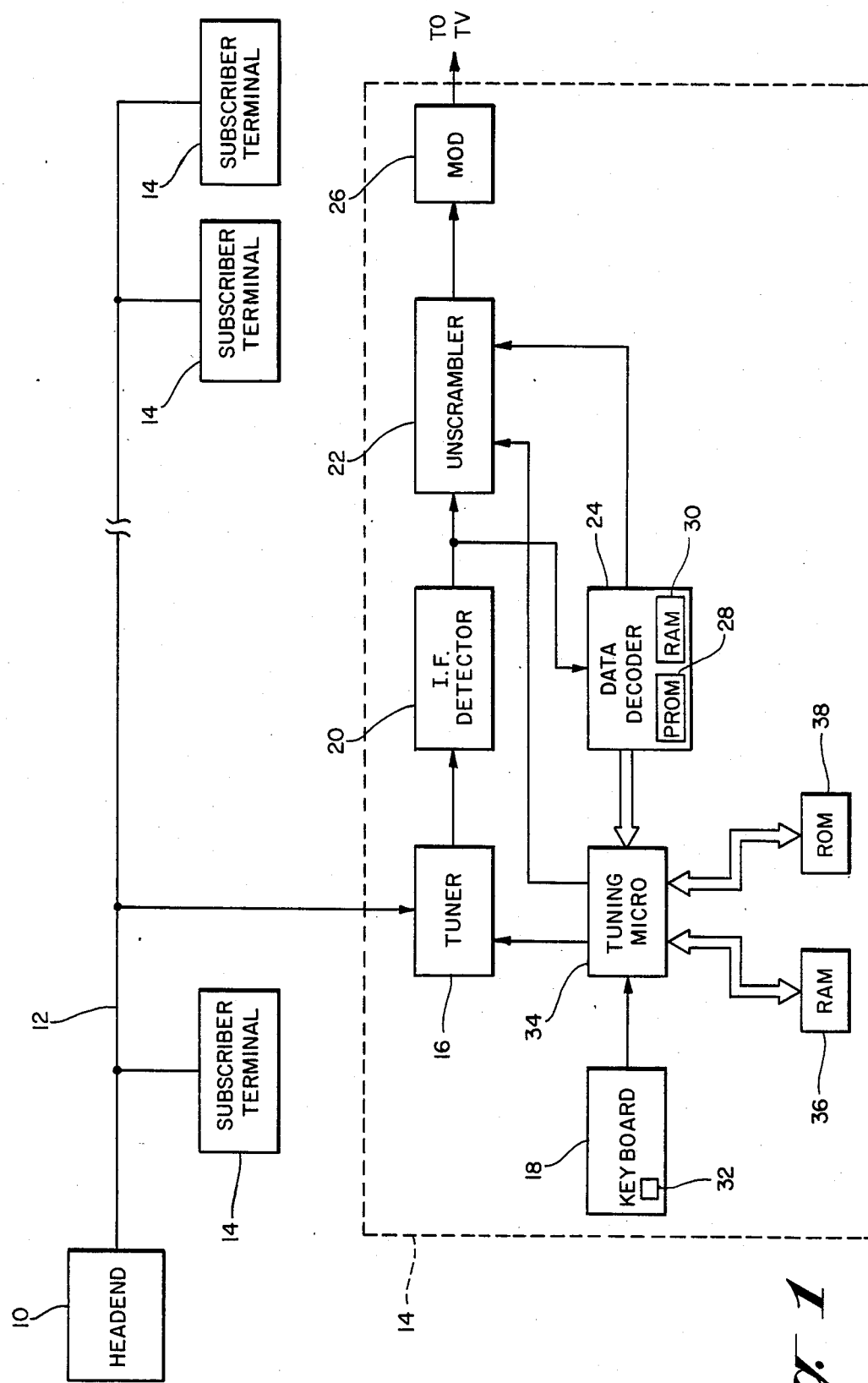
FIG. 1 is a block diagram showing a subscriber home terminal for use in the present invention.

Referring to FIG. 1, there is shown, in block diagram form, a CATV system according to the present invention. The CATV system generally comprises a central office or headend 10 which transmits CATV signals over a coaxial cable 12 to a plurality of subscriber terminals 14. Since all of the subscriber terminals 14 are essentially identical in construction, only one terminal is shown in detail in the Figure.

The CATV signals transmitted over coaxial cable 12 by headend 10 occupy respective RF channels each having a bandwidth of 6 MHz. As discussed previously, the channel configuration or format may conform to any one of a number of different formats, e.g., the FCC broadcast format, the HRC format or the IRC format. Regardless of the transmission format selected for use by the CATV operator, each RF channel is used to transmit a television signal in the form of an amplitude modulated picture carrier and an associated frequency modulated sound carrier separated in frequency by 4.5 MHz. The transmitted television signals are typically grouped into so-called basic and premium services, the premium service signals typically being transmitted by the headend 10 in a scrambled form to prevent viewing by unauthorized subscribers. Various data signals may also be transmitted from the headend 10 to selectively authorize the subscriber terminals 14 for unscrambling one or more of the premium channels, such data signals taking the form of predetermined codes inserted in selected horizontal lines of the vertical blanking intervals of the premium channels (hereinafter referred to as encoded channels) in a preferred embodiment of the invention. The data signals preferably include address codes for selectively addressing individual subscriber terminals 14 for downloading associated authorization codes establishing the authorization status of the terminal. The data signals further preferably include a predetermined market or system address code which must match a corresponding code stored in each subscriber terminal 14 for enabling the unscrambling function of the terminals thereby preventing their use in any other CATV system. Each transmitted premium program additionally includes a program code identifying the program or channel which is compared with the authorization code stored in each subscriber terminal 14 to establish whether or not the terminal is authorized for unscrambling the accompanying program. Finally, in accordance with the present invention, the transmitted data signals include a tuning mode command defining the RF channel transmission format (i.e., FCC broadcast standard, HRC or IRC) of the CATV system for downloading in the subscriber terminals 14.

Returning to FIG. 1, subscriber terminal 14 comprises a tuner 16 coupled to coaxial cable 12 for selecting a transmitted RF channel in response to a user entry on a keyboard 18. Tuner 16 preferably comprises a double converter which converts the selected RF channel to a predetermined intermediate frequency signal which is applied to a conventional intermediate frequency amplifier and detector circuit 20. A composite baseband video signal is developed at the output of circuit 20 and applied to an unscrambler 22 and a data decoder 24. Unscrambler 22, in response to a control signal from data decoder 24, is operable for unscrambling a scrambled video signal developed at the output of circuit 20 and for coupling the unscrambled video signal to a modulator 26. Modulator 26 modulates the unscrambled baseband signal onto a standard television channel carrier which may then be coupled to a conventional television receiver for viewing.

Data decoder 24 recovers and processes the various data signals received over the encoded channels. In particular, data decoder 24 comprises a PROM 28 storing an address code uniquely identifying the subscriber terminal and the common market or system address code associated with the CATV system. Data decoder 24 further comprises a RAM 30 for downloading and storing the transmitted authorization codes defining the authorization levels of the terminal. The authorization codes stored in RAM 30 may be changed from time to time by suitably addressing the terminal and providing an updated authorization code for downloading into RAM 30. This is done at headend 10 by transmitting the address code identifying the terminal followed by the new authorization code. Data decoder 24, after establishing that the transmitted address code matches the address code stored in PROM 28, will cause the associated authorization code to be stored in RAM 30 thereby updating the authorization status of the terminal.

As mentioned previously, each encoded channel transmitted by headend 10 includes a program code identifying the accompanying signal. Data decoder 24 compares this received program code with the authorization codes stored in RAM 30 to establish whether the terminal is authorized to unscramble the received signal. In addition, data decoder 24 compares the received market code transmitted with each encoded channel with the market code stored in PROM 28. If the two market codes match and the terminal is authorized for the signal being received, a control signal is coupled from data decoder 24 for enabling unscrambler 22 to unscramble the signal for viewing by the subscriber.

Operation of tuner 16 is controlled by a tuning microprocessor 34. Tuning microprocessor 34 is coupled to a RAM 36 and a ROM 38 as well as to keyboard 18. In response to a subscriber channel number entry on keyboard 18, tuning microprocessor 34 determines or calculates the tuning control signal required for operating tuner 16 for tuning the selected channel. The tuning control signals are derived by microprocessor 34 in accordance with a program stored in ROM 38 and a tuning mode command which is downloaded and stored in RAM 36. In a preferred embodiment of the invention, the downloaded and stored tuning mode command comprises two bits which define a particular channel transmission format. The tuning program stored in ROM 38 includes a look-up table comprising multiple sections each corresponding to a respective channel transmission format. Tuning microprocessor 34 accordingly derives the tuning control signals for operating tuner 16 for tuning the selected channel based on the information stored in the look-up table section identified by the tuning mode command downloaded and stored in RAM 36. The derived tuning control signal is then temporarily stored in RAM 36 for application to and control of tuner 16. While, in the preferred embodiment of the invention, the tuning mode command comprises two bits, it will be appreciated that in a more general sense the tuning mode command may comprise N bits, with RAM 36 including at least N single bit memory locations in which the tuning mode command is downloaded and RAM 38 being partitioned for storing no more than $2^N$ tuning data look-up tables each corresponding to a respective transmission format.

Keyboard 18 includes a terminal ON/OFF mode selection key 32 which couples a terminal ON/OFF mode selection signal to microprocessor 34. A terminal ON mode signal, generated in response to subscriber operation of key 32, allows microprocessor 34 to operate in its normal mode controlling tuner 16 for tuning an RF channel selected by the subscriber on keyboard 18. Also, in response to an ON mode signal, microprocessor 34 provides an enabling input to unscrambler 22. On the other hand, a terminal OFF mode signal causes microprocessor 34 to generate a signal for blanking the output of unscrambler 22 and, as will be explained in further detail hereinafter, also causes microprocessor 34 to execute a routine stored in ROM 38 for downloading into RAM 36 a two bit tuning mode command transmitted on the encoded channels by headend 10. The downloaded two bit tuning mode command, which replaces the two bit tuning mode command previously stored in RAM 36, defines the channel transmission format actually being used by the CATV system as previously explained.

More particularly, it will be recalled that the RF channel transmission format used by the CATV system may conform to any one of a number of different standards. As a consequence, ROM 38 is programmed for enabling microprocessor 34 to calculate the tuning information signals required to accurately tune the channels of all the transmission formats. Therefore, in order to facilitate proper tuning, microprocessor 34 must additionally be supplied with information identifying the transmission format actually being used by the CATV system. This information, which is stored as a two bit code in RAM 36, may assume any one of its four possible states when power is initially applied to the RAM. In order to establish this stored two bit code in the state identifying the channel transmission format actually in use by the system, a two bit tuning mode command is transmitted as a data signal along with the encoded channels for downloading in RAM 36. However, since not all of the transmitted channels are encoded data carrying channels and since, prior to downloading of the tuning mode command, it is not known which transmission format is being used in the system, accurate tuning of an encoded channel for facilitating tuning mode command downloading presents a considerable problem. This problem is overcome according to the invention by using the novel technique illustrated in flow chart form in FIG. 2.

Figure 2:
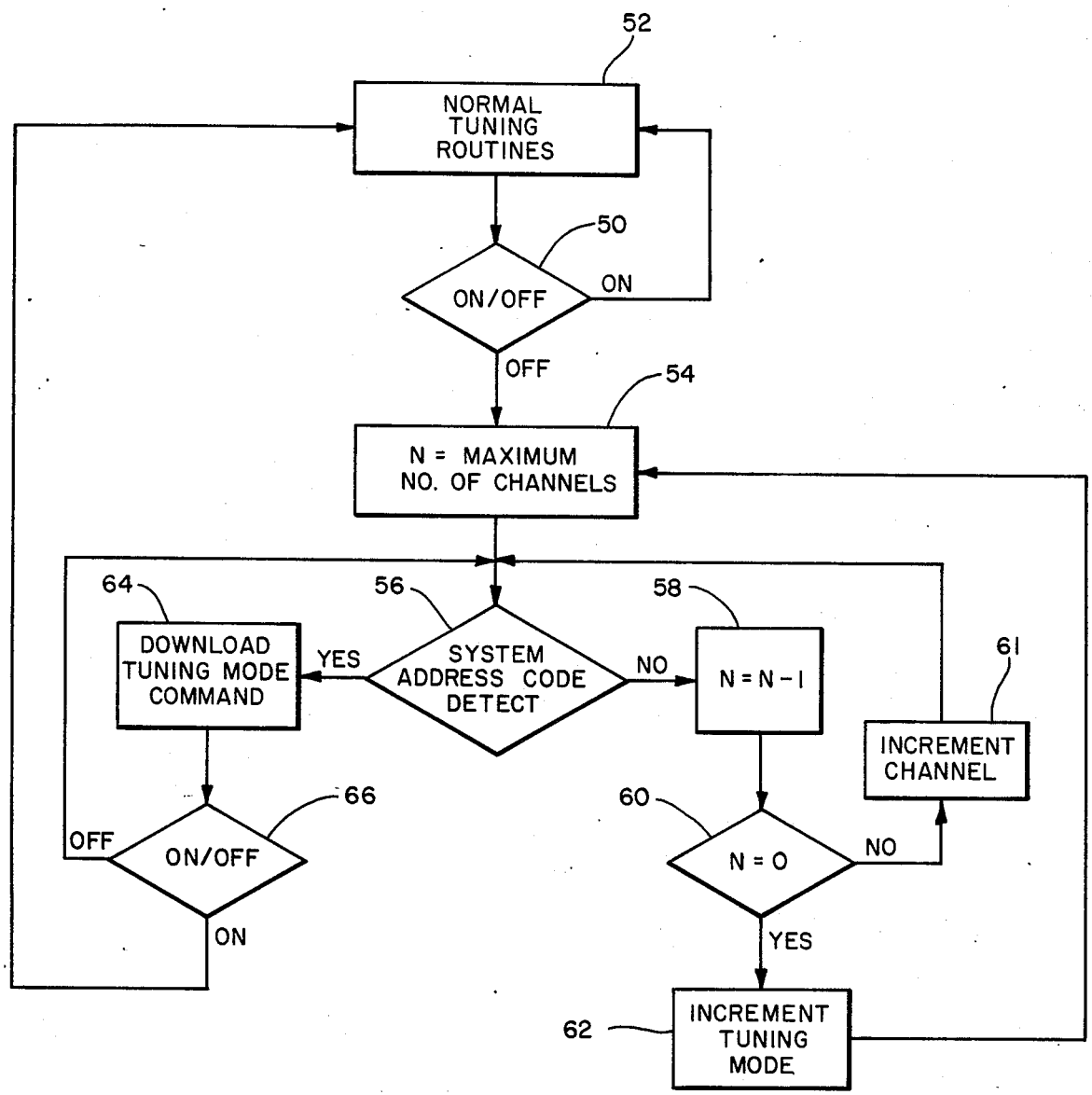
FIG. 2 is a flow chart illustrating the method of operating the subscriber home terminal of FIG. 1 according to the invention.

More particularly, the operation of tuning microprocessor 34 is controlled in accordance with a routine stored in RAM 38 and illustrated in FIG. 2. As indicated by a step 50, tuning microprocessor 34 continuously monitors the state of the terminal ON/OFF mode selection signal from keyboard 18 to determine whether the terminal is in an ON mode or an OFF mode. If the terminal is in an ON mode, indicating that the terminal is in use by the subscriber, microprocessor 34 is operated for executing the normal tuning routines stored in ROM 38 as represented by block 52. These normal tuning routines, of course, suitably control tuner 16 for tuning an RF channel selected by the subscriber on keyboard 18 as previously explained. On the other hand, if an OFF mode selection signal is detected in step 50, indicating that the terminal has been turned off and is not in use by the subscriber, a tuning mode command downloading routine is executed beginning with a step 54.

In step 54, a variable N is set which is equal to the maximum number of RF channels characterizing the CATV system. Next, a step 56 is executed wherein microprocessor 34 samples the output of data decoder 24 to determine whether the market or system address code stored in PROM 28 matches the market code being received on the presently tuned channel. It will be recalled that not all of the transmitted channels are encoded with data signals such that the presently tuned channel may not contain a market code at all. In that event, a match is not detected in step 56 and the routine branches to a step 58. Also, even if an encoded channel is being tuned, the tuning may be in accordance with the wrong transmission format (i.e., one not being used by the CATV system) so that the encoded data signals including the market code may be received inaccurately whereby a match will not be detected in step 56. In the latter event, the routine also branches to step 58.

According to step 58, microprocessor 34 decrements variable N by unity. Thereafter, a step 60 is executed wherein the current value of variable N is tested. If variable N is not equal to zero, the routine executes a step 61 wherein tuner 16 is operated for tuning the next successive RF channel and then is returned to step 56 where the newly tuned channel is interrogated for a market code match. If a market code match is again not detected, steps 58, 60 and 61 are re-executed. It will therefore be seen that the loop consisting of steps 56, 58, 60 and 61 will be sequentially executed for successive transmitted RF channels until either a market code match is detected or the variable N assumes a zero value, the latter indicating that all of the transmitted RF channels have been interrogated for a market code match. In this case, i.e., variable N assuming a value of zero, the routine proceeds to a step 62 in which the tuning mode stored in RAM 36 and characterizing the current operation of microprocessor 34 is incremented and the routine is returned to step 54. That is, if the loop consisting of steps 56, 58, 60 and 61 has been executed for each RF channel tuned according to a first channel transmission format (e.g., IRC) without the detection of a market match, the variable N is reset and the procedure is repeated but this time with the channels being tuned according to a second channel transmission format (e.g., HRC). If necessary, the procedure can be repeated for a third and as many further channel transmission formats as are afailable.

Eventually, an encoded channel will be properly tuned resulting in a market code match in step 56. It will be appreciated that this channel may or may not be tuned according to the channel transmission format actually being used by the CATV system since some channels in different formats are identically configured. That is, it will be recalled that most of the channels transmitted according to the FCC standard are identical to corresponding channels transmitted in the IRC standard. Thus, for example, eventhough microprocessor 34 may be operating tuner 16 for tuning according to the IRC format while transmissions from the headend are in accordance with the FCC standard, it would still be possible to accurately tune a channel and develop a market code match in step 56. A market code match in step 56, therefore, does not necessarily imply that the terminal is being operated in the same channel transmission format as is actually being used by the CATV system, but only that the data signals of an encoded channel are being accurately received.

In response to a market code match in step 56, indicating that the data signals of an encoded channel are being accurately received, the routine of FIG. 2 branches from step 56 to a step 64 wherein the transmitted tuning mode command is downloaded for storage in RAM 36. The downloaded tuning mode command defines the channel transmission format being used by the CATV system and causes the tuning microprocessor 34 to subsequently operate according to the so-defined format. After the execution of step 64, the state of the ON/OFF mode selection signal is checked in a step 66. If an OFF mode selection signal is still present, the routine is returned to step 56 and the terminal remains tuned to the encoded channel for receiving and processing further data signals. If, on the other hand, an ON mode selection signal is detected, indicating that the terminal has been turned on for use by the subscriber, the routine is returned to step 52 enabling operation according to the normal tuning routines. Such tuning routines will now be performed according to the same channel transmission format being used by the CATV system due to the previous downloading of the tuning mode command in RAM 36.

It will be appreciated that during installation of a terminal, either for the first time or after power has been removed from a previously installed terminal, certain steps should be taken to insure proper downloading of the tuning mode command. In particular, after applying or reapplying power to the terminal, care should be exercised to maintain the terminal in its OFF mode for a sufficient length of time to allow the routine of FIG. 2 to complete a full processing cycle. This will insure that proper downloading of the tuning mode command has been affected to facilitate proper tuning when the terminal is subsequently switched to its ON mode.

While a particular embodiment of the invention has been shown and described, it will be obvious to those skilled in the art that changes and modifications may be made without departing from the invention in its broader aspects. Therefore, the aim in the appended claim is to cover all such changes and modifications as fall within the true spirit and scope of the invention.

What is claimed is:

1. In a CATV system including a plurality of subscribers each having a CATV terminal operable for tuning received CATV signals transmitted over respective CATV channels configured in any one of a plurality of different transmission formats, at least some of said CATV signals comprising encoded data including a tuning mode command identifying the transmission format being used by the CATV system for downloading in said CATV terminals, an improved method of operating said terminals comprising the steps of:
    generating an on-mode signal representing that the terminal is in use and an off-mode signal representing that the terminal is not in use; tuning to a selected CATV channel in response to said on-mode signal and operating said terminal in response to said off-mode signals, for executing a plurality of sequential tuning cycles each comprising sequentially tuning successive CATV channels configured according to a different one of said formats until a tuned channel is detected on which said encoded data is being accurately received; and
    downloading said tuning mode command received over said detected channel into the terminal for enabling subsequent operation of the terminal for tuning CATV channels configured according to the format defined thereby.

2. The method of claim 1 wherein said encoded data includes a predetermined system address code and wherein said operating step comprises comparing the system address code associated with each tuned channel with a corresponding code stored in said terminal for detecting the channel on which said encoded data is being accurately received.

3. In a CATV system including a plurality of subscribers each having a CATV terminal operable for tuning received CATV signals transmitted over respective CATV channels configured in any one of a plurality of different transmission formats, at least some of said CATV signals comprising encoded data including a tuning mode command defining the transmission format being used by the CATV system, each of said terminals comprising:
    control means selectively operable for establishing a terminal on-mode signal representing that the terminal is in use or a terminal off-mode signal representing that the terminal is not in use;
    memory means for storing a code defining one of said transmission formats; and
    tuning means responsive to said on-mode signal for tuning a selected CATV channel configured in accordance with the transmission format defined by the code stored in said memory means and operable in response to said off-mode signal for executing a plurality of tuning cycles each comprising sequentially tuning successive CATV channels configured according to a different one of said transmission formats until a tuned channel is detected on which said encoded data is being accurately received and for thereupon downloading the tuning mode command received over said detected channel in said memory means in place of said code.

4. In a CATV system including a plurality of subscribers each having a CATV terminal operable for tuning received CATV signals transmitted over respective CATV channels configured in any one of a plurality of different transmission formats, at least some of said CATV signals comprising encoded data including a tuning mode command defining the transmission format being used by the CATV system, each of said terminals comprising:
    control means selectively operable for establishing a terminal on-mode signal representing that the terminal is in use or a terminal off-mode signal representing that the terminal is not in use;
    first memory means for storing a code defining one of said transmission formats; and
    tuning means responsive to said on-mode signal for tuning a selected CATV channel configured in accordance with the transmission format defined by the code stored in said first memory means and operable in response to said off-mode signal for executing a plurality of tuning cycles each comprising sequentially tuning successive CATV channels configured according to a different one of said transmission formats until a channel is tuned on which correspondence is detected between a predetermined code transmitted as part of said encoded data and a corresponding code stored in said terminal and for thereupon downloading the tuning mode command received over said detected channel in said first memory means in place of said code.

5. A terminal according to claim 4 wherein said tuning means includes a second memory means storing tuning data in a plurality of separate memory partitions each corresponding to a respective transmission format, said tuning mode command downloaded in said first memory means identifying the partition of said second memory means corresponding thereto, and further including means for coupling the tuning data stored in the so-identified memory partition to said tuning means.

6. A terminal according to claim 5 wherein said tuning mode command comprises N bits, said first memory means comprises a RAM including at least N single bit memory locations in which said tuning mode command is downloaded and said second memory means comprises a ROM storing no more than $2^N$ tuning data look-up tables each corresponding to a respective transmission format.

7. A terminal according to claim 6 wherein said tuning means includes a tuning microprocessor for deriving tuning information signals in response to the ROM tuning data look-up table corresponding to the transmission format defined by the tuning mode command downloaded in said RAM.

* * * * *